United States Patent
Himel

(10) Patent No.: US 9,561,769 B2
(45) Date of Patent: Feb. 7, 2017

(54) APPARATUS FOR CONTROLLING AN AIRBAG MODULE

(71) Applicant: JENOPTIK Optical Systems GmbH, Jena (DE)

(72) Inventor: Marc Himel, Winter Springs, FL (US)

(73) Assignee: JENOPTIK Optical Systems GmbH, Jena (DE)

(*) Notice: Subject to any disclaimer, the term of this patent is extended or adjusted under 35 U.S.C. 154(b) by 49 days.

(21) Appl. No.: 14/224,512

(22) Filed: Mar. 25, 2014

(65) Prior Publication Data

US 2014/0288782 A1    Sep. 25, 2014

Related U.S. Application Data

(60) Provisional application No. 61/804,974, filed on Mar. 25, 2013.

(30) Foreign Application Priority Data

Mar. 25, 2013   (DE) .................. 10 2013 005 039

(51) Int. Cl.
*B60R 22/00*   (2006.01)
*E05F 15/00*   (2015.01)
(Continued)

(52) U.S. Cl.
CPC ......... *B60R 21/01538* (2014.10); *B60R 21/01* (2013.01); *B60R 21/015* (2013.01); *B60R 21/01512* (2014.10)

(58) Field of Classification Search
None
See application file for complete search history.

(56) References Cited

U.S. PATENT DOCUMENTS 6,164,693 A   12/2000   Mattes et al.
7,227,626 B2   6/2007   Ertl et al.
(Continued)

FOREIGN PATENT DOCUMENTS

DE   44 10 402 A1   9/1994
DE   197 24 344 C1   8/1998
(Continued)

OTHER PUBLICATIONS

Yang et al., Occupant Pose and Location Detect for Intelligent Airbag System Based on Computer Vision, Oct. 2008, IEEE.*

*Primary Examiner* — Yonel Beaulieu
*Assistant Examiner* — Lail Kleinman
(74) *Attorney, Agent, or Firm* — Muncy, Geissler, Olds & Lowe, P.C.

(57) ABSTRACT

An apparatus for controlling an airbag module in a vehicle cabin is provided that includes a control apparatus for triggering the airbag module, a plenoptic camera configured as a camera module that generates image data having depth information within a prespecifiable region in the vehicle cabin with the prespecifiable region comprising at least a first and a second partial region of a trigger region of the airbag module, and an evaluation device which determines on the basis of the image data whether an object, in particular a vehicle occupant, is located in the first or the second partial region and the control apparatus controls the airbag module in dependence on the position of the object.

17 Claims, 2 Drawing Sheets

(51) Int. Cl.
*G05D 1/00* (2006.01)
*G05D 3/00* (2006.01)
*G06F 7/00* (2006.01)
*G06F 17/00* (2006.01)
*B60R 21/015* (2006.01)
*B60R 21/01* (2006.01)

(56) References Cited

U.S. PATENT DOCUMENTS

| | | |
|---|---|---|
| 7,403,635 B2 | 7/2008 | Belau et al. |
| 7,607,509 B2 | 10/2009 | Schmiz et al. |
| 2002/0195806 A1* | 12/2002 | Thomas ............ B60R 21/01538 280/735 |
| 2003/0040859 A1* | 2/2003 | Farmer ................ B60R 21/013 701/45 |
| 2006/0023918 A1* | 2/2006 | Ertl et al. ...................... 382/107 |
| 2006/0120565 A1* | 6/2006 | Belau et al. ................... 382/107 |
| 2007/0280505 A1* | 12/2007 | Breed ............................ 382/104 |
| 2010/0141802 A1* | 6/2010 | Knight et al. ............. 348/240.3 |
| 2013/0044254 A1 | 2/2013 | Tzur |

FOREIGN PATENT DOCUMENTS

| | | |
|---|---|---|
| DE | 102 41 993 B3 | 4/2004 |
| DE | 103 08 405 A1 | 9/2004 |
| DE | 103 21 506 A1 | 12/2004 |
| DE | 10 2012 016 160 A1 | 2/2013 |
| DE | 10 2011 053 999 A1 | 3/2013 |
| DE | 10 2011 114 325 A1 | 3/2013 |
| WO | WO 02/40320 A1 | 5/2002 |
| WO | WO 03/089277 A1 | 10/2003 |

\* cited by examiner

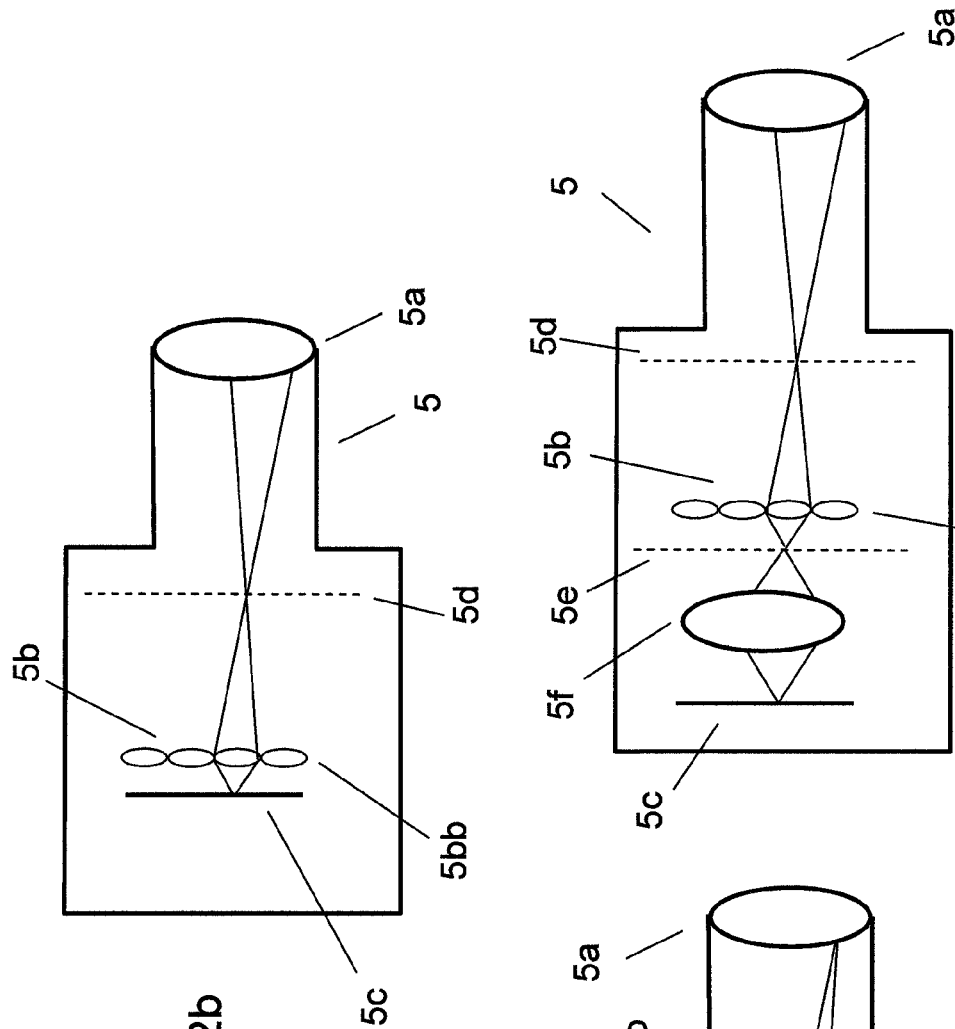

APPARATUS FOR CONTROLLING AN AIRBAG MODULE

This nonprovisional application claims priority to German Patent Application No. 10 2013 005 039.1, which was filed in Germany on Mar. 25, 2013, and to U.S. Provisional Application No. 61/804,974, which was filed on Mar. 25, 2013, and which are both herein incorporated by reference.

BACKGROUND OF THE INVENTION

Field of the Invention

The present invention relates to an apparatus for controlling an airbag module.

Description of the Background Art

Motor vehicles equipped with safety systems, for example airbag modules, are known from the prior art. The airbag modules serve to minimize injuries to occupants in the event of an accident of the motor vehicle.

However, should it be the case that the occupant is located near the exit of the airbag module, there is a risk that the airbag module itself will injure the occupant. In this context, studies have shown that it is children in particular which can be injured severely by an airbag module. One study by the ADAC, for example, has found that small children sitting in an infant seat sustain presumably serious head and neck injuries caused by the passenger airbag. This is in fact only because of the force of impact of the airbag module. Even a minor accident, at low speed, can lead to grave or fatal injuries. The ADAC study furthermore found that bigger children that sit too close to the dashboard are struck by the deploying airbag. This can result in broken bones, grazes and burns. Even more severe injuries can occur if the legs of the child are located in the deployment area of the airbag module.

In order to avoid these cases, various solutions are already known from the prior art. For example, it is known to switch off the airbag module in various driving situations.

DE 197 24 344 C1, which corresponds to U.S. Pat. No. 6,164,693, discloses that a manually operable switch with at least one switch position is provided in a motor vehicle, which switch is assigned to an occupation type for which the passenger airbag must not be activated, and that a control unit is present which deactivates the passenger airbag if the switch is in said switching position, and that means are provided which, after starting the motor, prevent the vehicle from moving if the switch was not activated. In order to rule out forgetting of a switch actuation, it is ensured that the vehicle can only be made to move when the switch has been activated. DE 44 10 402 A1 discloses a hand switch with which the airbag of a seat can be switched on and off.

It is additionally also known to monitor an occupant area using a plurality of camera modules, and to trigger the airbag module in dependence of a position of the occupant. However, such occupant safety systems are complicated to manage and relatively expensive to produce because of the many individual components, in particular because of the plurality of camera modules.

SUMMARY OF THE INVENTION

It is therefore an object of the invention to provide an apparatus for controlling an airbag module which has few individual parts.

In an embodiment of the invention, an apparatus for controlling an airbag module in a vehicle cabin has the following features: a control apparatus for triggering the airbag module; a plenoptic camera configured as a camera module, which generates image data having depth information within a prespecifiable region in the vehicle cabin, with the prespecifiable region comprising at least a first and a second partial region of a trigger region of the airbag module; an evaluation device which determines on the basis of the image data whether an object, in particular a vehicle occupant, is located in the first or second partial region and the control apparatus controls the airbag module in dependence on the position of the object. Using what is known as a plenoptic camera according to the invention, it is possible to obtain depth information of the region to be measured with exactly one camera module. Further camera modules are therefore no longer necessary. According to the invention, the camera module, the evaluation device, the control apparatus and the airbag module are connected to one another such that they communicate at least electrically.

The technical feature "depth information" according to the invention can be understood to mean information which contains both the direction and the distance of the image data generated relating to objects within the prespecifiable region. The technical feature "prespecifiable region" according to the invention can be understood to mean the image angle of the plenoptic camera. For a desired region, for example the front region of a vehicle cabin, it is thus possible using the image data to calculate exactly where and in which position an object is located within said region. The partial regions of the trigger region of the airbag module located within the prespecifiable region, that is to say the first partial region, the second partial region, and any further partial regions, can be selected freely depending on the vehicle type and the arrangement of airbag module and any seat position of a vehicle occupant.

In an embodiment, the camera module furthermore comprises the following features: an objective which images objects in the prespecifiable region in an image plane of the camera module; a sensor generating image data; a microlens array which is arranged between the sensor and the objective, wherein each microlens in the microlens array images the objects, which are imaged by the objective, on the sensor.

In a further embodiment, the microlens array can be arranged in the image plane. In a further preferred embodiment, the microlens array is arranged between the image plane and the sensor. In a further preferred embodiment, a further lens is provided which is arranged between the sensor and the microlens array, wherein the further lens images the objects, which are imaged in an intermediate image plane by each individual microlens of the microlens array, on the sensor.

In a further embodiment, the control apparatus triggers the airbag module if the object is located in the first partial region, and the airbag module is not triggered by the control apparatus if the object is located in the second partial region. This therefore takes account of the fact that the airbag module must not damage or injure any occupant or object located in the second partial region.

A further embodiment is characterized in that the evaluation device is configured such that it detects whether a child seat including a child sitting on it is arranged in the prespecifiable region. In this case, the control apparatus does not trigger or only partially triggers the airbag module in dependence on the size of the child. According to the invention, this takes account of the fact that children are particularly at risk from a triggered airbag module.

In a further embodiment, the trigger region of the airbag module comprises a first, a second and a third partial region, and the airbag module is triggered if the object is located in the first partial region, the airbag module is triggered partially if the object is located in the second partial region, and the airbag module is not triggered if the object is located in the third partial region. If parts of the object are located in the first and/or second partial region, and parts of the object are located in the third partial region, the invention makes provision for the control apparatus not to trigger the airbag module. This case may occur, for example, if the legs are located near the airbag module, in particular in an exit region of the airbag module, that is to say in the third partial region, while torso and head are located in the first and/or second partial region. This is because particularly grave injuries may be caused by what is known as the "jack-knife effect."

In a further embodiment, the object is an occupant, in particular the torso and/or the head and/or the legs of the occupant. In a further preferred embodiment, the evaluation device comprises a face detection module or other body detection modules. The evaluation device is thus able to detect, using the generated image data, whether an occupant is located in the prespecifiable region or not, and to furthermore derive from the image data in which partial regions of the trigger region the occupant or specific body parts of the occupants is/are located.

In a further embodiment, the sensor is configured as an infrared sensor, in particular as what is known as an LWIR sensor in a wavelength range of from 8 to 15 μm. Such an embodiment is particularly advantageous since external light sources illuminating the prespecifiable region can be omitted.

In a further embodiment, the evaluation device calculates, using sensor data, whether the object will, at a later time when the airbag module has already been triggered, be located in the first, second, or third partial region. In this embodiment, the airbag module is triggered if the object will be located in the first partial region at said later time, the airbag module is partially triggered if the object will be located in the second partial region at said later time, and the airbag module is not triggered if the object will be located in the third partial region at said later time. The sensors may preferably be acceleration sensors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2a shows a schematic illustration of a first embodiment of a plenoptic camera according to the invention;

FIG. 2b shows a schematic illustration of a second embodiment of a plenoptic camera according to the invention;

FIG. 2c shows a schematic illustration of a third embodiment of a plenoptic camera according to the invention.

DETAILED DESCRIPTION

Figure 1:
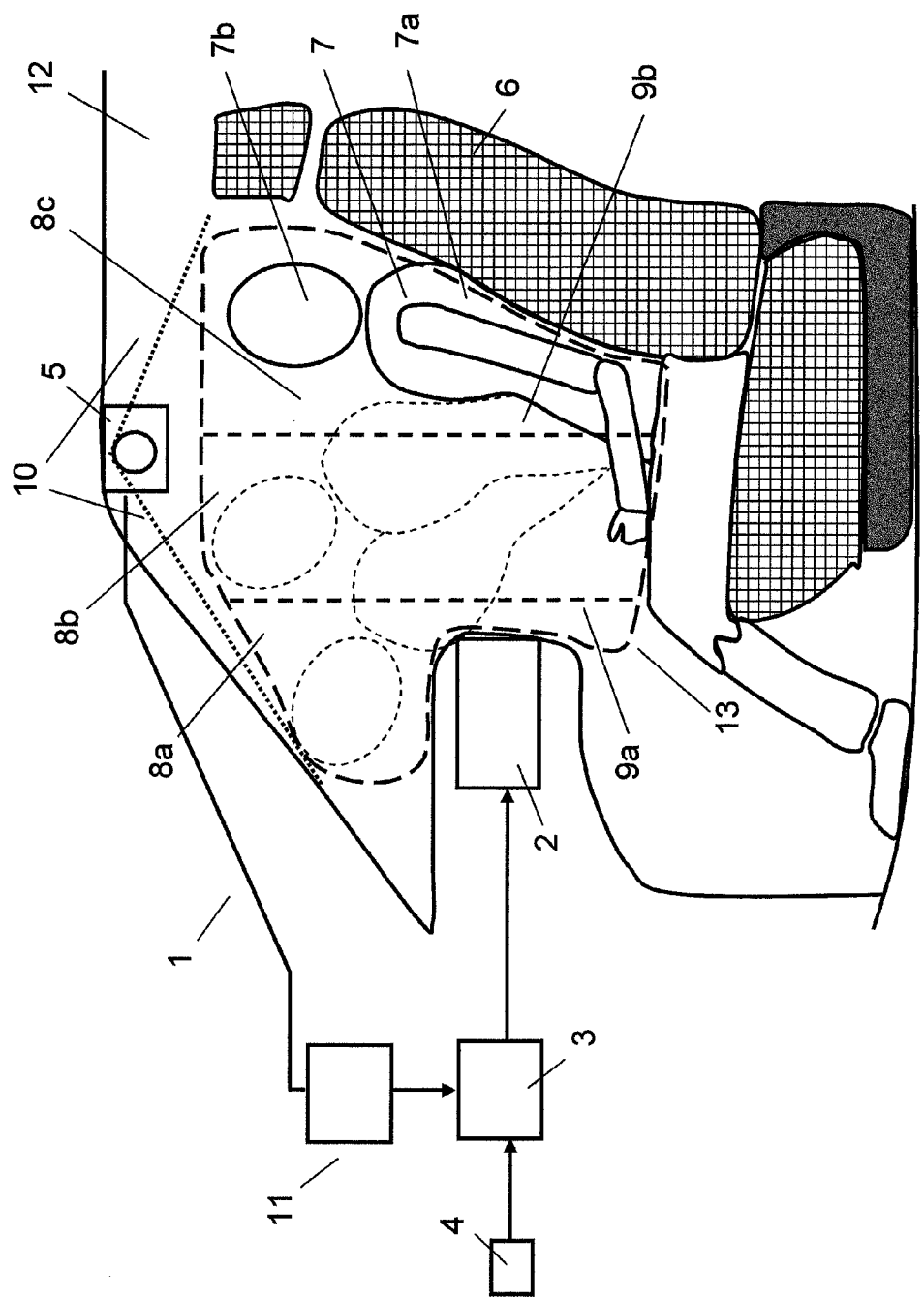
FIG. 1 shows a structure of an apparatus according to the invention for controlling an airbag module.

FIG. 1 schematically shows a side view of a passenger vehicle cabin 12 of a motor vehicle. The motor vehicle is equipped with an airbag module 2 and an apparatus 1 according to the invention for controlling the airbag module, wherein the airbag module is integrated fully in a dashboard. Alternatively, it is of course also possible for the airbag module to be a module which is arranged in the rear of the motor vehicle or in a door panel of the motor vehicle. Additionally, it may also be a driver airbag module or a passenger airbag module.

In an exemplary embodiment, a plenoptic camera is configured as a camera module 5 and the function of which will be explained later in more detail with reference to FIGS. 2a to 2c. The plenoptic camera 5 is mounted on a roof liner or on an upper boundary wall of the vehicle cabin 12 and monitors a front region of the vehicle cabin, wherein said region 10 is defined by the location of the mounting and the image angle of the plenoptic camera 5, and is thus referred to according to the invention as "prespecifiable region."

In this front region, two vehicle seats 6 are arranged, with the side view according to FIG. 1 showing only one vehicle seat. An occupant can be seen in the vehicle seat 6, for example the passenger 7 of the motor vehicle. The greater part of the body of the driver 7, in particular the torso 7a and the head 7b, is located in a first partial region 8c of a trigger region 13 of the airbag module 2, which is indicated schematically by a dashed line 13. The trigger region 13 has two further partial regions, specifically a second partial region 8b and a third partial region 8a, wherein the exit region of the airbag module 2 is arranged in the third partial region 8a. The separation of the individual partial regions is intended to be illustrated here schematically by further dashed lines 9a and 9b. A person skilled in the art knows that the trigger region 13, and thus the various partial regions, can take various forms and sizes depending on the vehicle type and type of the airbag module.

The plenoptic camera, which is configured as the camera module 5, is connected to an evaluation device 11, which processes image data generated by the camera module 5 and evaluates in which of the three partial regions 8a, 8b or 8c the occupant, or preferably the head or the torso of the occupant, is located. Possible positions of the head 7b of the occupant in specific driving situations in the three partial regions are correspondingly marked by dashed lines. Based on the evaluation by the evaluation device 11, a control apparatus 3, which is configured for example as a microcomputer, triggers the airbag module 2 if the torso or the head is located in the first partial region 8c. The airbag module is triggered only partially if the torso or the head is located in the second partial region 8b, whereas the airbag module is not triggered if the torso or the head is located in the third partial region 8a. A person skilled in the art will know that it may be specified to the control apparatus under which conditions (head and/or torso or other body parts) the airbag module is triggered or not triggered. To this end, the evaluation device can additionally comprise a face detection module so as to be able to derive uniquely from the generated image data in which of the partial regions the head is located. Other body detection modules are also conceivable.

The apparatus for controlling the airbag module furthermore comprises a crash sensor unit 4, which determines whether the motor vehicle has undergone an impact at all. Said crash sensor unit 4 is connected to the control apparatus 3 such that they electrically communicate with one another. The crash sensor unit 4 can be, for example, one or more acceleration sensors that can be integrated in the control apparatus or distributed within the motor vehicle. The crash sensor unit can, for example, be two acceleration sensors. The airbag module is triggered only if both sensors, independently of one another, indicate a corresponding delay, or in other words: it is an essential precondition for triggering the airbag module independently of in which partial region the object is located that an impact of the motor vehicle is determined by the crash sensor unit.

The mode of function of the plenoptic camera, which is configured as the camera module, will now be explained in more detail with reference to FIG. 2a. A plenoptic camera comprises in principle an objective 5a, a sensor 5c and what is known as a microlens array 5b, with the microlens array comprising a plurality of small microlenses 5bb. First, it is the task of the objective 5a to generate the image of an object 7 in an image plane 5d in front of the microlens array. Each pixel is once again refracted by each microlens 5bb of the microlens array and is expanded to form a cone which strikes the sensor surface 5c in the shape of a circle. The microlens array can be imagined as a plurality of small cameras which view the image generated by the objective under various directions. Each microlens 5bb of the microlens array thus generates one image.

Since each individual pixel under a microlens records a parallax, it is possible to generate individual images through the decomposition and joining of comparable pixels, from which ultimately the depth information according to the invention can be calculated using the evaluation device. The microlens array can be located according to FIG. 2a directly in the image plane of the objective or can, as illustrated in FIG. 2b, be focused on said image plane. According to FIG. 2c it is also possible for a further lens 5f to be provided, which is arranged between the sensor 5c and the microlens array 5b, and for the further lens 5f to image the objects, which are imaged by each individual microlens 5bb of the microlens array in an intermediate image plane 5E, on the sensor.

It is thus possible using the plenoptic camera to detect predefined objects 7 in a depth-resolved manner in a prespecifiable region and to determine in which partial region of the trigger region of the airbag module, which is located within the prespecifiable region, said objects are located and to decide, using said evaluation, whether the airbag module is to be triggered or not by the control apparatus 3.

Overall, the apparatus according to the invention makes available a compact device for controlling an airbag module which can omit a plurality of individual components on account of a plenoptic camera being used.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for controlling an airbag module in a vehicle cabin, the apparatus comprising:
   a control apparatus connected to a trigger of the airbag module;
   a plenoptic camera of a camera module, which generates image data having depth information within a prespecifiable region in the vehicle cabin with the prespecifiable region comprising at least a first partial region, a second partial region, and a third partial region of a trigger region of the airbag module; and
   an evaluation device processing the image data to determine whether an object is located in the first partial region, the second partial region, or the third partial region,
   wherein the control apparatus controls the airbag module such that
   if the evaluation device determines the object is in the second partial region at the time of impact, the control apparatus partially deploys the airbag module,
   if the evaluation device determines the object is in the third partial region at the time of impact, the control apparatus does not trigger the airbag module,
   wherein the evaluation device calculates if the object will be located in the first partial region, the second partial region, or the third partial region at a later time after the time of impact, such that
   if the object is located in the first partial region at the time of impact, and the evaluation device calculates that, at the later time after impact, the object will be in the second partial region, then the airbag module is partially deployed by the control apparatus.

2. The apparatus as claimed in claim 1, wherein the camera module comprises:
   an objective that images objects in the prespecifiable region in an image plane of the camera module;
   a sensor generating image data; and
   a microlens array arranged between the sensor and the objective, wherein each microlens of the microlens array images the objects, which are imaged by the objective on the sensor.

3. The apparatus as claimed in claim 2, wherein the microlens array is arranged in the image plane.

4. The apparatus as claimed in claim 2, wherein the microlens array is arranged between the image plane and the sensor.

5. The apparatus as claimed in claim 2, wherein a further lens is provided, which is arranged between the sensor and the microlens array, and the further lens images the objects, which are imaged in an intermediate image plane by each individual microlens of the microlens array on the sensor.

6. The apparatus as claimed in claim 1, wherein the evaluation device is configured such that it detects whether a child seat including a child sitting on it is arranged in the prespecifiable region and wherein the control apparatus in this case does not trigger or only partially triggers the airbag module.

7. The apparatus as claimed in claim 1, wherein the trigger region is located within the prespecifiable region.

8. The apparatus as claimed in claim 2, wherein the sensor is configured as an infrared sensor or an LWIR sensor in a wavelength range of from 8 to 15 µm.

9. The apparatus as claimed in claim 1, wherein the airbag module is triggered if the object will be located in the first partial region at said later time, the airbag module is partially triggered if the object will be located in the second partial region at said later time, and the airbag module is not triggered if the object will be located in the third partial region at said later time.

10. An airbag deployment control apparatus of a vehicle, comprising:
    a single plenoptic camera capturing image data having depth information within a prespecifiable region of a vehicle cabin with the prespecifiable region comprising at least a first partial region, a second partial region, and a third partial region;

an airbag module including a trigger for deploying an airbag;

a control apparatus;

an evaluation device processing the image data to determine whether an occupant of the vehicle is located in the first partial region, the second partial region, or the third partial region at a time of impact, wherein the control apparatus controls the airbag module such that if the occupant is in the first partial region at the time of impact, the airbag module is triggered, if the occupant is in the third partial region at the time of impact, the airbag module is not triggered, wherein the evaluation device calculates if a head of the occupant will be located in the first partial region, the second partial region or the third partial region at a later time after the time of impact, and wherein if the head of the occupant is in the second partial region, and the evaluation device calculates that the head of the occupant will be in the third partial region at the later time after the time of impact, then the airbag is not triggered.

11. The airbag deployment control apparatus of a vehicle of claim 10, wherein the impact is detected by a crash sensor.

12. The airbag deployment control apparatus of a vehicle of claim 10, wherein the airbag is partially triggered in the event, if the head of the occupant is in the second partial region or the occupant is a child, and if the head of the occupant will not be in the third partial region at the later time after impact.

13. The airbag deployment control apparatus of a vehicle of claim 10, wherein the first partial region, second partial region, and third partial region each change depending on the seat position.

14. The apparatus as claimed in claim 1, wherein the object is a vehicle occupant, a child, or a child seat.

15. The apparatus as claimed in claim 1, wherein if at the time of impact a first portion of the object is in the third partial region and a second portion of the object is in the second partial region or first partial region, the airbag module is not deployed.

16. The apparatus as claimed in claim 1, wherein if the object will be in the first partial region at the later time after impact, the airbag module is deployed.

17. The apparatus as claimed in claim 1, wherein if the object will be in the third partial region at the later time after impact, the airbag module is not deployed.

* * * * *